(12) United States Patent
Franchini

(10) Patent No.: US 6,324,929 B1
(45) Date of Patent: Dec. 4, 2001

(54) TOOTHED GEARING GROUP FOR COUPLING TWO CONCENTRIC SHAFTS TO A SOLITARY DRIVING SHAFT

(76) Inventor: Giuseppe Franchini, Interrato Acqua Morta, 10-37129 Verona (IT)

( * ) Notice: Subject to any disclaimer, the term of this patent is extended or adjusted under 35 U.S.C. 154(b) by 0 days.

(21) Appl. No.: 08/904,253

(22) Filed: Jul. 31, 1997

(30) Foreign Application Priority Data

Aug. 8, 1996 (IT) .............................................. VR96A0071

(51) Int. Cl.[7] ....................................................... F16H 1/02
(52) U.S. Cl. ............................ 74/412 R; 74/413; 74/417; 74/665 GB
(58) Field of Search ................................. 74/412 R, 413, 74/417, 423, 665 GA, 665 GB, 665 K

(56) References Cited

U.S. PATENT DOCUMENTS 3,244,024 * 4/1966 Flowers ................................. 74/665 K
5,494,466 * 2/1996 Vernea ................................. 74/417 X
5,724,867 * 3/1998 Jordan ................................. 74/655 K

FOREIGN PATENT DOCUMENTS 0 665 916    9/1949  (GB) .
1 436 491    5/1976  (GB) .
2 165 024    4/1986  (GB) .

* cited by examiner

*Primary Examiner*—David Fenstermacher
(74) *Attorney, Agent, or Firm*—Guido Modiano; Albert Josif; Daniel O'Byrne

(57) ABSTRACT

A toothed gearing group comprising two concentric twin shafts, an inner one and an outer one, respectively, a main gear for each twin shaft which is rigid in rotation therewith, a solitary shaft which has a first coupling gear in in meshing engagement with the main gear of the inner or outer shaft, and a second coupling gear, and at least one intermediate shaft rigid in rotation with two coupling gears in meshing engagement with the second coupling gear of the solitary shaft and with the main gear of the inner or outer shaft, respectively.

10 Claims, 5 Drawing Sheets

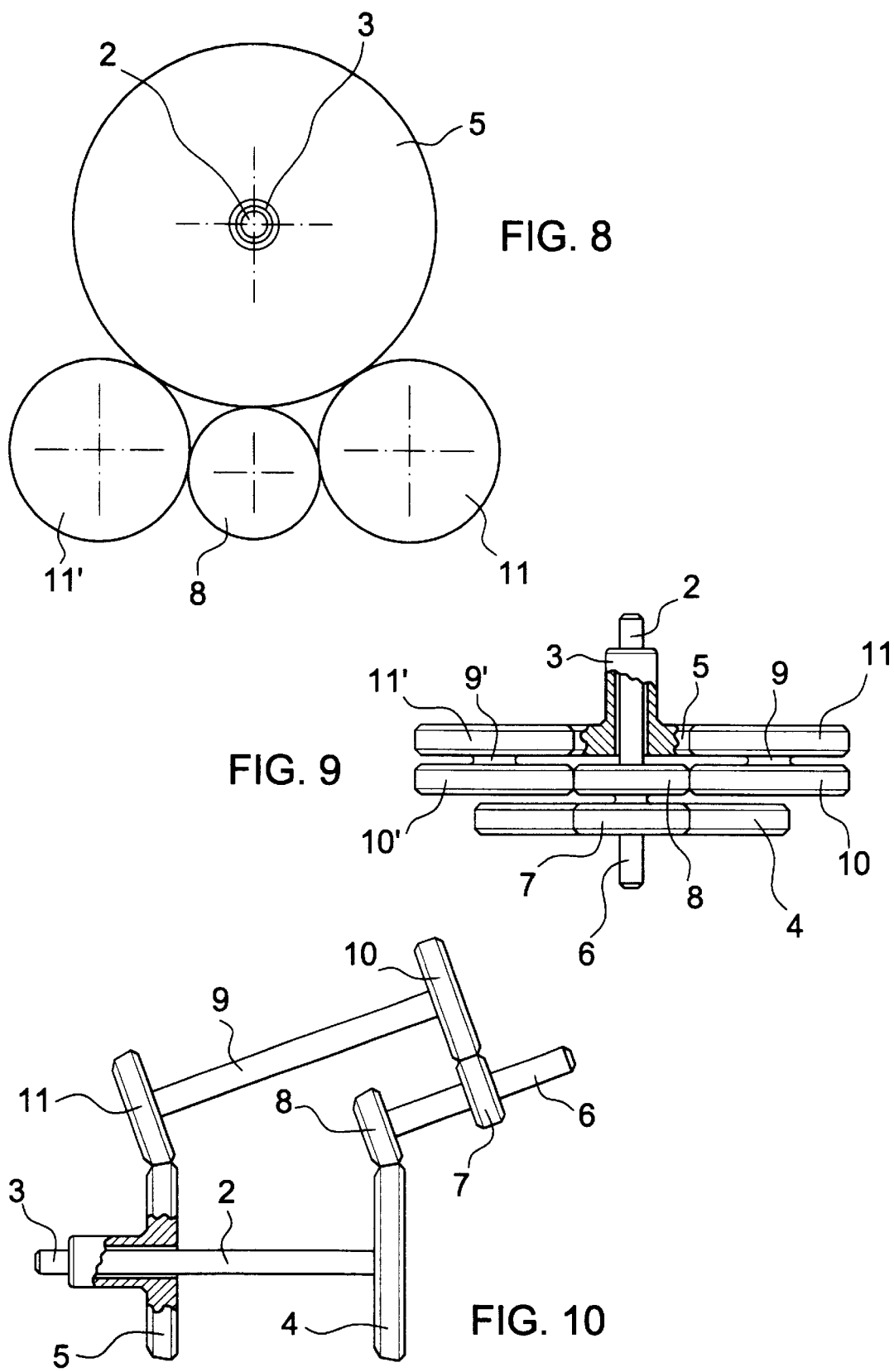

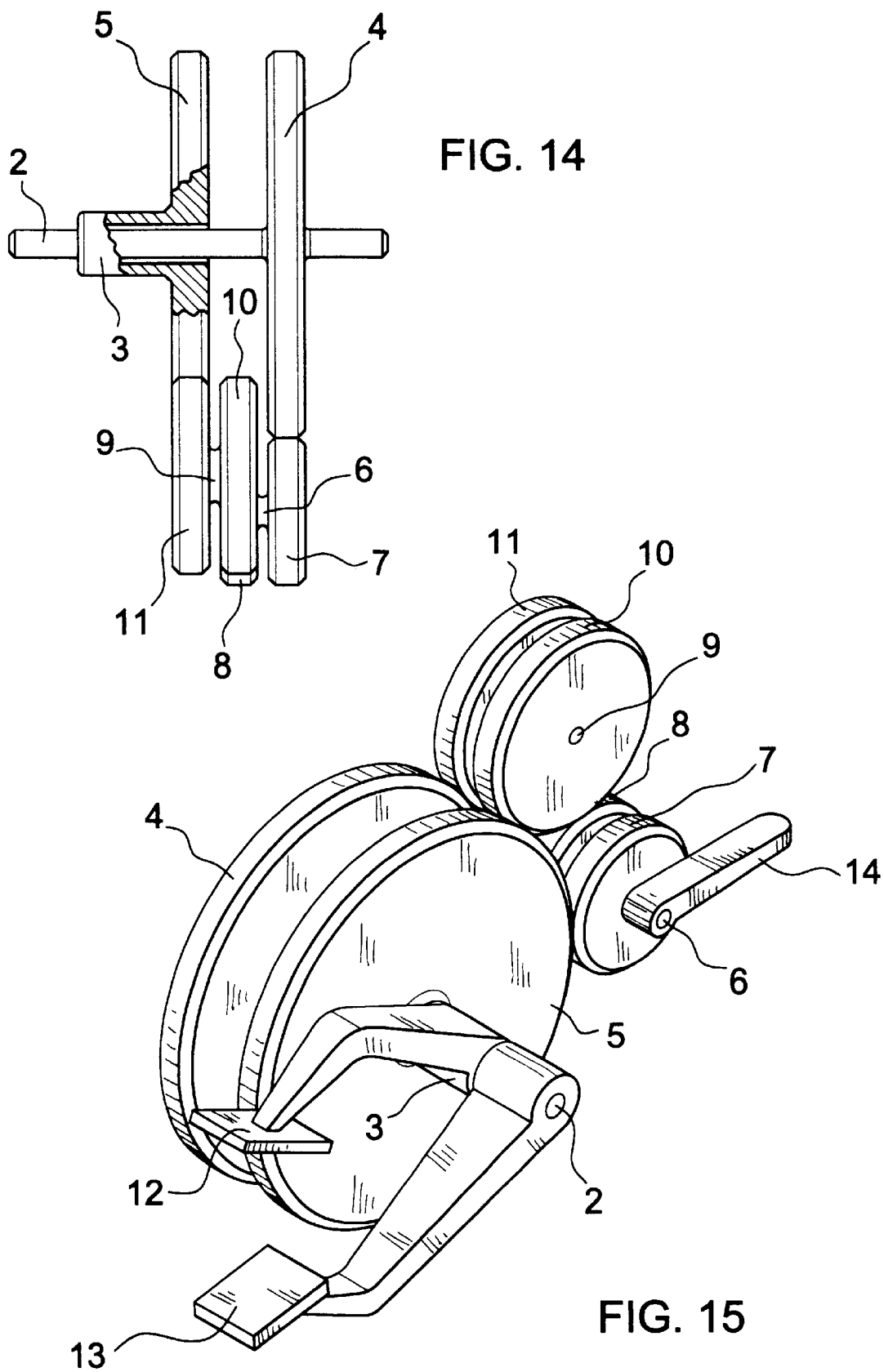

TOOTHED GEARING GROUP FOR COUPLING TWO CONCENTRIC SHAFTS TO A SOLITARY DRIVING SHAFT

BACKGROUND OF THE INVENTION

The present invention relates to a toothed gearing group for coupling two concentric shafts to a solitary driving shaft.

As known, power is transmitted from a machine to a fluid or from a fluid to a user device with greater efficiency if one uses a pair of counter-rotating propellers. Up to now, energy has been transmitted from a motor to a fluid (air) by using two motors, each designed to drive a respective propeller independently, or by using a single motor but with a drive using planet and crown gear transmission which is similar in principle to the differential of a motor vehicle.

The use of a transmission, however, has the drawback that the solitary input driving shaft is always arranged either at right angles or parallel to the output of the two user shafts; this, in addition to the known drawbacks due to overall dimensions, to weight and the mechanical complexity owing to the use of bevel gears, considerably limits the number of convenient applications.

Moreover, it is impossible to select rotation of the driving shaft concordant with anyone of the twin shafts.

SUMMARY OF THE INVENTION

An object of the present invention is to provide a new toothed gearing group with straight gears for coupling two concentric (twin) and counter-rotating shafts to a solitary driving shaft which is arranged to ensure parallelism between the axes of the driving shaft and the twin shafts.

Another object of the present invention is to provide a new toothed gearing group which makes it possible to apply power to anyone of the three shafts (either twin shafts or driving shaft) and to draw power from the other two or to apply power to two of the shafts and draw it from the third one, i.e., it makes it possible to obtain fully reversible operation.

Another object of the present invention is to provide a toothed gearing group which is very simple in structure, so as to combine mechanical simplicity with high reliability.

This and other objects which will become apparent hereinafter are achieved by a toothed gearing group according to the present invention, which is characterized in that it comprises two concentric twin shafts, an inner one and an outer one respectively, a main gear for each twin shaft, which is rigid in rotation therewith; a solitary shaft which has a first coupling gear in meshing engagement with the main gear of the inner or outer shaft and a second coupling gear, and at least one intermediate shaft rigid in rotation with two coupling gears meshing respectively with the second coupling gear of the said solitary shaft and with the main gear of the said inner or outer shaft, respectively.

Advantageously, the said twin shafts are parallel to the solitary shaft and to the intermediate shaft and the gears are all straight gears.

BRIEF DESCRIPTION OF THE DRAWINGS

Further aspects and advantages of the present invention are described in greater detail hereinafter with reference to some practical embodiments thereof, given by way of non-limiting examples and illustrated in the accompanying drawings, wherein:

FIGS. 8 and 9 are a plan view and a side view, respectively, of a toothed gearing group according to the invention with two intermediate shafts;

FIGS. 10 and 11 are each a diagrammatic view of a toothed gearing group according to the present invention having bevel gears and oblique shafts with the only two possible positions for the hidden coupling and in which the solitary shaft and the outer twin shaft rotate concordantly;

FIG. 14 is a side elevation view, with cut-away parts, of a toothed gearing group according to the present invention having a 1:1 transmission ratio and in which a direct power take-off on the inner main gear is provided; and FIG. 15 is a perspective view of an application of a toothed gearing group according to the present invention, such as that shown in FIG. 6, to a caliper or gripper device.

In the various Figures of the accompanying drawings, identical or similar parts or components have been designated by the same reference numerals.

DESCRIPTION OF THE PREFERRED EMBODIMENTS

Figure 1:
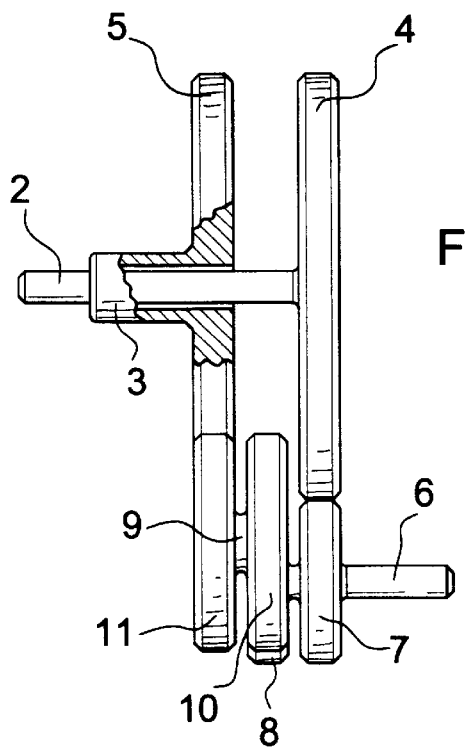
FIG. 1 is a side elevation view, with cut-away parts, of a first embodiment of a toothed gearing group according to the invention with parallel shafts and straight gears, wherein concordant rotation between the solitary shaft and the outer twin shaft is achieved.
Figure 2:
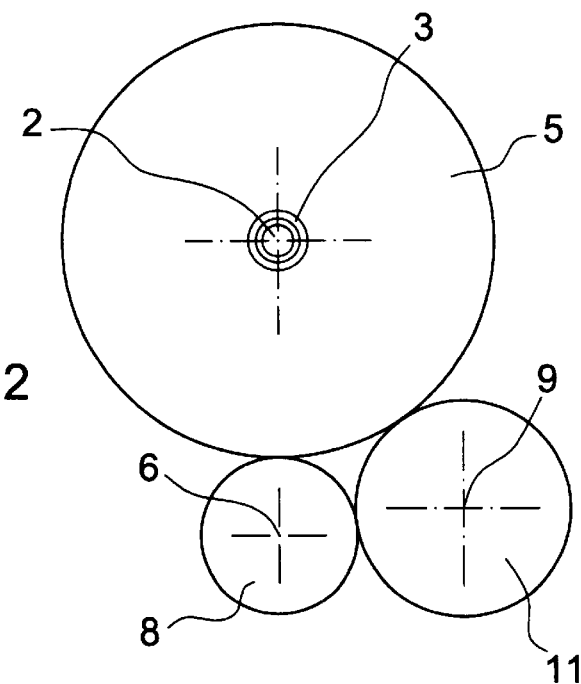
FIG. 2 is a diagrammatic side view of the toothed gearing group of FIG. 1.
Figure 3:
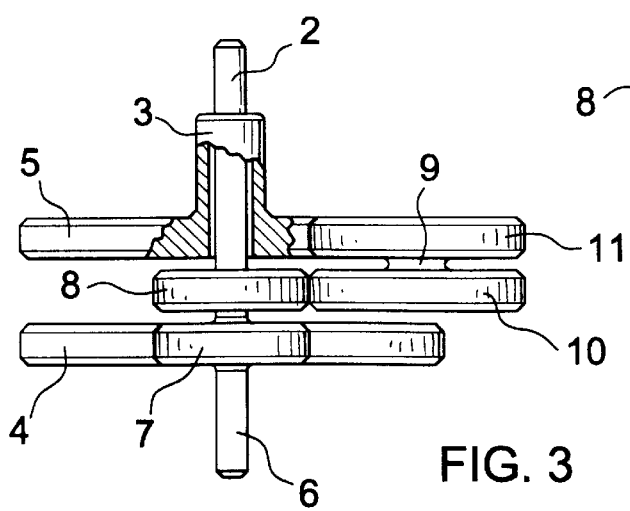
FIG. 3 is a bottom view with cut-away parts of the toothed gearing group of FIG. 2.

With reference first to FIGS. 1 to 3, it will be noted that a toothed gearing group 1 according to the present invention comprises two concentric twin shafts, an inner one 2 and an outer tubular one 3, each shaft being rigid in rotation with the other, e.g. integral with one another, with a respective main gear 4 and 5; a solitary shaft 6, which extends to the opposite side with respect to the twin shafts and on which a first coupling gear 7 in meshing engagement with the main gear 4 of the inner shaft 2 and a second coupling gear 8 are keyed or otherwise fixed, and an intermediate shaft 9, which in turn is rigid in rotation with two coupling gears 10 and 11, one of which, the gear 10, meshes with the second coupling gear 8 of the solitary shaft 6, whilst the other gear 11 meshes with the main gear 5 of the outer shaft 3.

It will be noted that in such a toothed gearing group direct meshing engagement exists between gear 7 and the main gear 4 (inner engagement), between gear 8 of the solitary shaft 6 and the gear 10 of the intermediate shaft (hidden engagement) and between gear 11 of the intermediate shaft 9 and the outer main gear 5 (outer engagement).

Furthermore, direct engagement of the solitary shaft 6 with one of the twin shafts occurs by means of the inner main gear 4, so as to obtain concordant direction of rotation for solitary shaft and outer twin shaft.

The gears 4, 5; 7, 8; 10 and 11 are all straight gears and thus the twin shafts 2 and 3 are parallel both to the solitary shaft 6 and to the intermediate shaft 9.

A toothed gearing group as described above can find many practical applications. Thus, for example, the solitary shaft can be driven by a source of motion, e.g. an electric motor, and could transmit motion to two counter-rotating propellers applied to the pair of twin shafts 2 and 3. Moreover, a system of this kind can be used to draw energy from wind and transmit it to an electric power generator. In both these examples of application high efficiency is achieved by virtue of the use of counter-rotating propellers.

If one wishes to maintain the same rotation rate for the solitary shaft 6 and the twin shafts 2 and 3, gears 7 and 8 for the solitary shaft should be identical to the main gears 4 and 5, whereas if one wishes to obtain an increase or decrease in the rotation rate, gears for the solitary shaft should be larger or smaller, respectively, than the main gears.

An equal modulus of the rotation rates of the twin shafts 2 and 3 is achieved by means of three pairs of gears, each being formed by mutually identical gears, whereas the gears 7 and 8 of the solitary shaft are smaller than the gears of the intermediate shaft 9, which are in turn smaller than the main gears 4 and 5.

Figure 4:
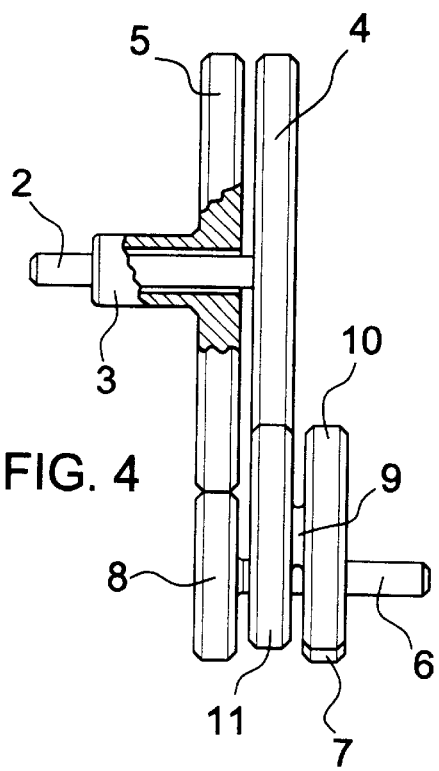
FIGS. 4 and 5 are side views, with cut-away parts, of two possible configuration variations of the gears, in which the hidden coupling is on the side of the inner or outer main gear.
Figure 5:
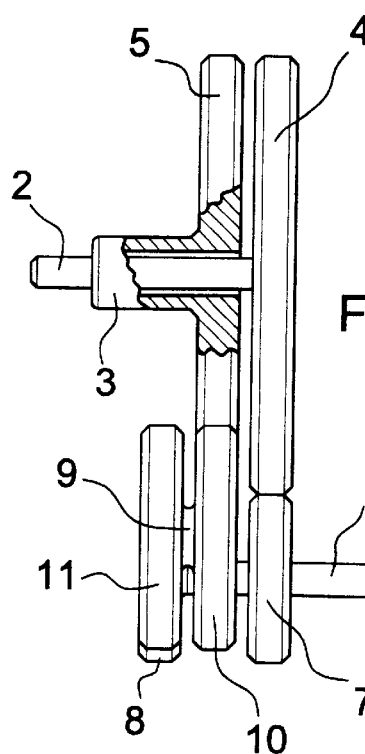

If one wishes to move the main gears 4 and 5 mutually closer, it is possible to move the hidden coupling between the solitary shaft 6 and the intermediate shaft 9 either towards the inner main gear 4, as shown in FIG. 4, or towards the outer main gear 5, as shown in FIG. 5.

Figure 6:
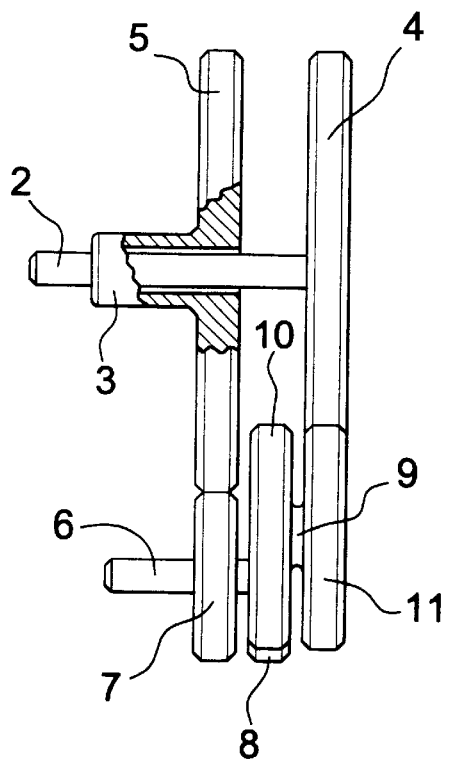
FIG. 6 is a side elevation view of an embodiment of the toothed gearing group with all power take-offs arranged on the same side.

Power take-offs constituted by the inner shaft 2 and the solitary shaft 6, other than in the embodiments shown in FIGS. 1 to 5, can also be arranged both on the same side, as shown in FIG. 6.

Figure 7:
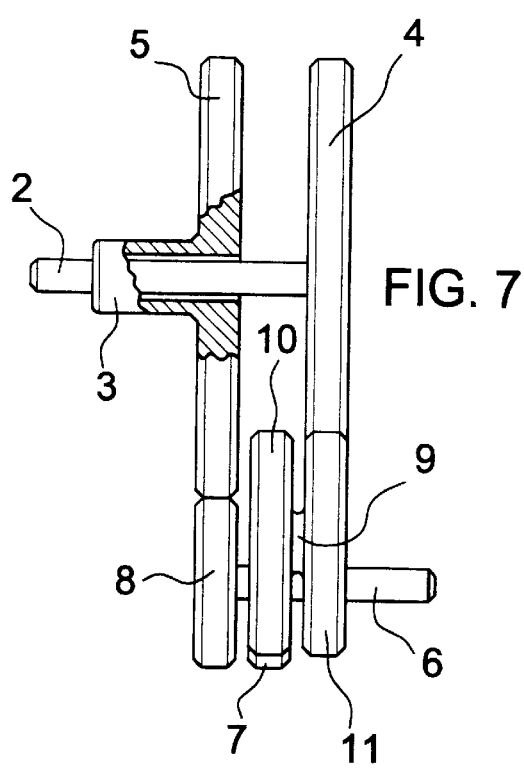
FIG. 7 is a view of another embodiment of the toothed gearing group, in which the solitary shaft and the inner main gear rotate concordantly.

FIG. 7 is a view of an embodiment in which direct engagement between the solitary shaft 6 and one of the twin shafts 2 and 3 occurs by meshing engagement with the outer main gear 5, so that the solitary shaft 6 and the inner twin shaft 2 rotate concordantly.

The embodiment illustrated in FIGS. 8 and 9 comprises two intermediate shafts 9 and 9', each of which is rigid in rotation with two gears, respectively 10, 10' and 11, 11', arranged on opposite sides with respect to the solitary shaft 6. In other words, it is possible to double and in any case increase the number of intermediate shafts with respective gears in order to better distribute the loads among the gears of the gearing group.

The embodiments shown in FIGS. 10 to 13 relate to gearing groups which include bevel gears, which make it possible to vary within wide limits the angle of inclination between the axis of the solitary shaft 6 and the axis of the twin shafts 2 and 3.

Figure 11:
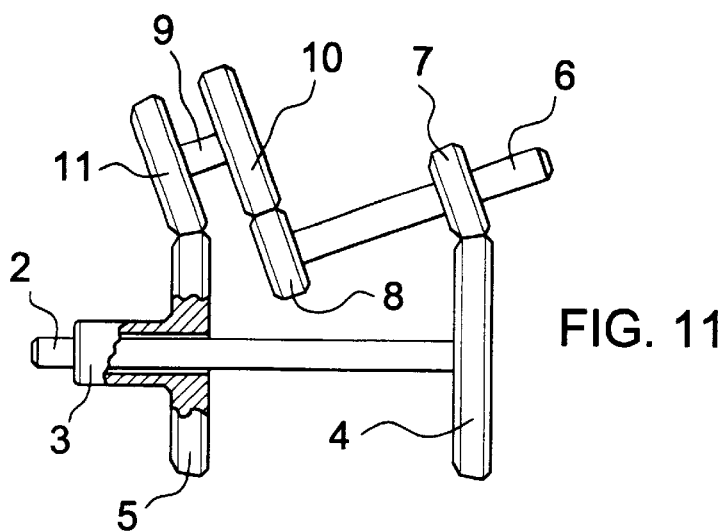

More particularly, FIGS. 10 and 11 illustrate two embodiments, in which two coaxial and counter-rotating twin shafts 2 and 3 can be driven by means of a solitary shaft which is inclined with respect to the twin shafts, the inclination being determined by the taper of the main gears 4 and 5 and by the gears 8 (FIG. 10) and 7 (FIG. 11) on the solitary shaft 6 and 11 on the intermediate shaft 9. This is possible only if the axes of the twin shafts 2 and 3, of the solitary shaft 6 and on the intermediate shaft 9 are all on a same plane.

Differently from the embodiments with cylindrical gears, there are only two possible positions for the hidden engagement.

Figure 12:
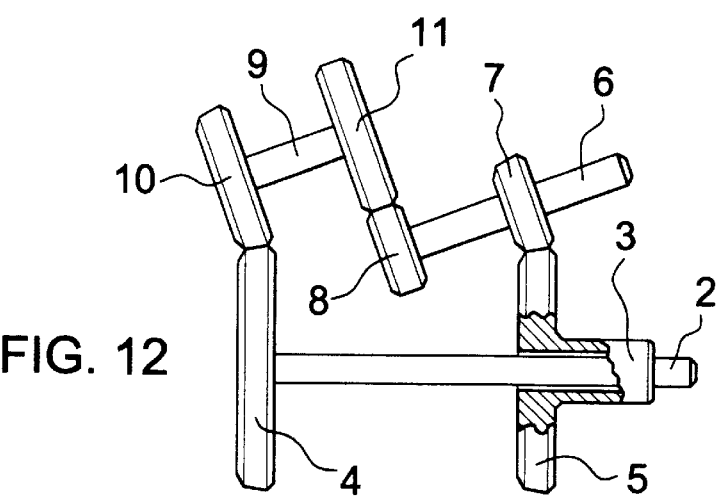
FIG. 12 shows an embodiment of the toothed gearing group with bevel gears, in which all power take-offs are on the same side.

FIG. 12 shows an embodiment in which all the power take-offs are facing toward one side. In this example, too, there are only two possible variations of hidden engagement.

Figure 13:
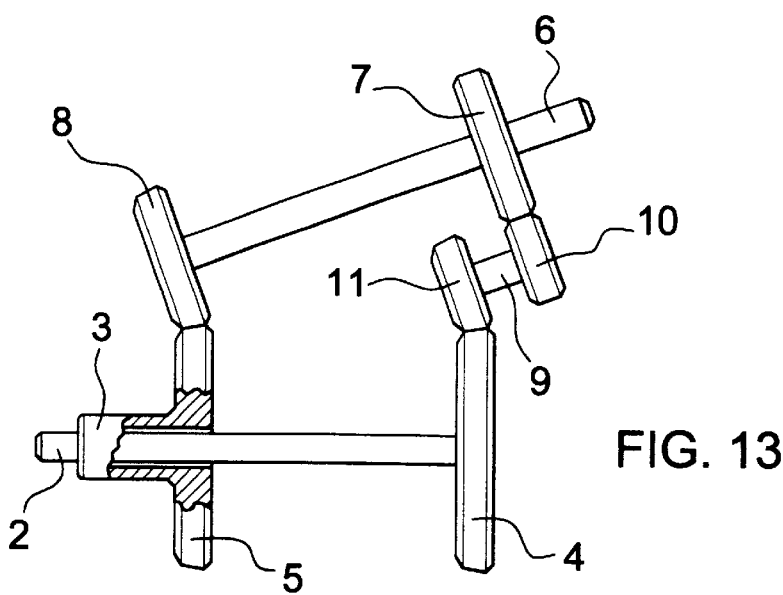
FIG. 13 is a diagrammatic view of a variation of FIG. 10, in which the solitary shaft and the inner twin shaft rotate concordantly.

The embodiment shown in FIG. 13 shows that it is possible to match the direction of rotation of the solitary shaft 6 with either one of the twin shafts 2 and 3 by exchanging the position of the solitary shaft 6 with respect to the intermediate shaft 9.

As in the case in which only cylindrical gears are used, if one wishes to reduce or increase the rotation rate when passing from the solitary shaft 6 to the twin shafts 2 and 3, it is sufficient to provide gears on the solitary shaft which are smaller or larger, respectively, than the main gears 4 and 5. In order to have a 1:1 speed ratio gears 7 and 8 must be identical to the main gears.

FIG. 14 shows an embodiment of a gearing group according to the invention, in which a 1:1 reduction ratio is attained by using a power take-off directly on the inner main gear 4.

While maintaining the difference in the directions of rotation of the twin shafts, it is also possible to vary their speed module so that one shaft revolves more slowly than the other.

This can be done according to one of the following solutions:

by providing different dimensions for the gears of the solitary shaft 6;

or by providing different dimensions for the gears on the intermediate shaft;

or by providing different dimensions for the main gears;

or even by adopting a combination of the above solutions.

The limit imposed by planar arrangement of the axes of the twin, free and intermediate shafts instead makes it impossible to provide additional intermediate shafts besides the shaft 9.

Further embodiments of a gearing group of the kind described above are naval applications for driving two counter-rotating propellers for the propulsion of powered watercraft. A watercraft provided with such a gearing group is easier to control since its behavior is uniform for both port and starboard turns owing to the mutual balancing of gyroscopic torques of the two propellers. Any unwanted overturning torque, which acts in the opposite direction with respect to the rotation of one propeller, is also eliminated. Furthermore, the adoption of two driving propellers instead of one makes it possible to achieve a much higher efficiency, which can be estimated to be on the order of more than 10%.

Similar considerations apply to aircraft.

Finally, a gearing group according to the present invention can be used advantageously for actuating caliper mechanisms, where two jaws 12 and 13 of a caliper, which are keyed on the outer twin shaft 3 and on the inner twin shaft 2, respectively, as diagrammatically shown in FIG. 15, are to be simultaneously actuated. In this case, an actuation lever 14 may be keyed to the solitary shaft 6 and may in turn be actuated either manually or by a suitable source of motion.

The above-described gearing group is susceptible of numerous modifications and variations within the protection scope as defined by the appended claims.

What is claimed is:

1. Gearing group consisting of:

two concentric twin shafts, said two concentric twin shafts including an inner shaft and an outer shaft in which said inner and outer shafts have a common axis of rotation and in which said inner shaft is freely rotatable within said outer shaft;

a first main gear rigidly connected in rotation with said inner shaft, and a second main gear rigidly connected in rotation with said outer shaft;

a solitary drive shaft which has a first coupling gear rigidly connected in rotation therewith and in direct meshing engagement with one of said first and second main gears, and said solitary drive shaft having a second coupling gear rigidly connected in rotation therewith; and an intermediate shaft having a first coupling gear and a second coupling gear both of which are rigidly connected in rotation with said intermediate shaft, said second coupling gear of said solitary drive shaft meshing directly with said first coupling gear of said intermediate shaft, and said second coupling gear of said intermediate shaft meshing directly with the other of said first and second main gears other than said one of said first and second main gears with which said first coupling gear of said solitary drive shaft directly meshes;

said solitary drive shaft and said intermediate shaft extending in mutually parallel directions and inclined with respect to said common axis of rotation of said inner and outer shafts, said first and second main gears and the coupling gears which mesh directly with said first and second main gears all being bevel gears.

2. Gearing group according to claim 1, wherein said solitary drive shaft and said intermediate shaft extend inclined with respect to said inner and outer shafts by an angle which is a function of the taper of the said bevel gears, and the axes of all of said solitary shaft and said intermediate shaft and said inner and outer shafts lying on the same plane.

3. Gearing group according to claim 1, wherein said inner and outer shafts and said solitary drive shaft are directed toward the same side of said gearing group.

4. Gearing group according to claim 1, wherein said inner and outer shafts and said solitary shaft are directed toward mutually opposite sides of said gearing group.

5. Gearing group according to claim 1, wherein said solitary drive shaft is driven by a motor.

6. Gearing group consisting of:

two concentric twin propeller shafts, said two concentric twin propeller shafts including an inner propeller shaft and an outer propeller shaft in which said inner and outer propeller shafts have a common axis of rotation and in which said inner propeller shaft is freely rotatable within said outer propeller shaft;

a first main gear rigidly connected in rotation with said inner propeller shaft, and a second main gear rigidly connected in rotation with said outer propeller shaft;

a solitary drive shaft which has a first coupling gear rigidly connected in rotation therewith and in direct meshing engagement with one of said first and second main gears, and said solitary drive shaft having a second coupling gear rigidly connected in rotation therewith; and an intermediate shaft having a first coupling gear and a second coupling gear both of which are rigidly connected in rotation with said intermediate shaft, said second coupling gear of said solitary drive shaft meshing directly with said first coupling gear of said intermediate shaft, and said second coupling gear of said intermediate shaft meshing directly with the other of said first and second main gears other than said one of said first and second main gears with which said first coupling gear of said solitary drive shaft directly meshes;

said solitary drive shaft and said intermediate shaft extending in mutually parallel directions and inclined with respect to said common axis of rotation of said inner and outer propeller shafts, said first and second main gears and the coupling gears which mesh directly with said first and second main gears all being bevel gears.

7. Gearing group according to claim 6, wherein said solitary drive shaft and said intermediate shaft extend inclined with respect to said inner and outer propeller shafts by an angle which is a function of the taper of the said bevel gears, and the axes of all of said solitary drive shaft and said intermediate shaft and said inner and outer propeller shafts lying on the same plane.

8. Gearing group according to claim 6, wherein said inner and outer propeller shafts and said solitary drive shaft are directed toward the same side of said gearing group.

9. Gearing group according to claim 6, wherein said inner and outer propeller shafts and said solitary drive shaft are directed toward mutually opposite sides of said gearing group.

10. Gearing group according to claim 6, wherein said solitary drive shaft is driven by a motor.

\* \* \* \* \*